US006475621B1

(12) United States Patent
Kohli et al.

(10) Patent No.: US 6,475,621 B1
(45) Date of Patent: *Nov. 5, 2002

(54) WATER BASED PRIMER COMPOSITIONS

(75) Inventors: Dalip Kohli, Bel Air, MD (US); Elaine Dickerson, Tuntenhausen (DE)

(73) Assignee: Cytec Technology Corp., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,073

(22) Filed: Sep. 11, 1998

Related U.S. Application Data

(60) Provisional application No. 60/058,719, filed on Sep. 12, 1997.

(51) Int. Cl.$^7$ .......................... B32B 15/08; B32B 15/18; B32B 27/38; C08K 3/20; C08L 63/00

(52) U.S. Cl. ................. 428/411.1; 428/416; 428/423.1; 428/425.8; 428/457; 428/458; 428/463; 428/522; 523/404; 523/414; 528/93; 528/103; 528/124

(58) Field of Search .............................. 428/416, 414, 428/411.1, 423.1, 447, 448, 450, 480, 522, 425.8, 457, 458, 463; 523/404, 414; 528/93, 103, 124

(56) References Cited

U.S. PATENT DOCUMENTS

| | | | |
|---|---|---|---|
| 2,872,427 A | 2/1959 | Schroeder | 523/402 |
| 3,417,064 A | 12/1968 | Bailey | 528/393 |
| 3,417,678 A | 12/1968 | Ewers | 427/138 |
| 4,001,154 A | 1/1977 | Schmidt | 524/548 |
| 4,035,345 A | 7/1977 | Ducloux et al. | 528/322 |
| 4,056,208 A | 11/1977 | Prejean | 215/12.2 |
| 4,100,140 A | 7/1978 | Zahir et al. | 526/90 |
| 4,355,122 A | 10/1982 | Fan | 523/423 |
| 4,638,038 A | 1/1987 | Salensky | 525/533 |
| 5,001,173 A | 3/1991 | Anderson et al. | 523/406 |
| 5,077,354 A | 12/1991 | Woo et al. | 528/26 |
| 5,139,601 A | 8/1992 | Holmes-Farley et al. | 156/329 |
| 5,214,098 A | * 5/1993 | Setiabudi et al. | 525/109 |
| 5,401,466 A | * 3/1995 | Folt et al. | 422/56 |
| 5,461,090 A | 10/1995 | Sweet | 523/404 |
| 5,576,061 A | 11/1996 | Sweet | 427/379 |
| 5,627,222 A | 5/1997 | Recker et al. | 523/400 |
| 5,641,818 A | 6/1997 | Sweet | 523/404 |

FOREIGN PATENT DOCUMENTS

| | | |
|---|---|---|
| EP | WO97/17144 | 5/1997 |
| WO | WO 94/06876 | 3/1994 |

OTHER PUBLICATIONS

Alger, Polymer Science Dictionary, 2nd Edition, pp. 286–287, Apr. 1999.*
Encyclopedia of Polymer Science and Engineering, vol. 1: Additives, pp. 472–475.*
Cornell PDC MSDS for FM 400 Adhesive Film.*
W.D. Bascom, "Structure of Silane Adhesion Promoter on Glass and Metal Surfaces," Marcromolecules, vol. 5, No. 6, pp. 792–798, Nov.–Dec. 1972.
M. Gettings et al., "Use of Auger and X–Ray Photoelectron Spectroscopy to Study the Locus of Failure of Structural Adhesive Joints," Journal of Applied Polymer Science, vol. 21, pp. 2375–2392, 1977.
F.J. Boerio et al., "Structure and Properties of Organosilane Primers For Adhesive Bonding," Applications of Surface Science, vol. 7, pp. 19–31, 1981.
W.T. Collins, "Adhesion Promoters," Handbook of Coating Additives, Marcel Dekker, Inc., New York and Basel, Chapter 10, pp. 281–294, 1986.
Yen–Yau H. Chao et al., "Two–Part Acrylic Enhances Vacuum Forming Operations," Adhesives Age, pp. 18–20, Feb. 1986.
E.P. Plueddemann, "State–of–the–Art of Silane Coupling Agents", Proc. Am. Soc. for Composites, 1st Tech. Conf., Dayton, OH, pp. 264–278 (1986).
A.R. Siebert et al., "CTBN–Modified Epoxies Work in Poor Bonding Condition," Adhesion Age, vol. 29, p. 19, 1986.
D.J. Ondrus, et al., "Effect of Substrates on the Structure of Polymer Interphases," Journal of Colloid and Interface Science, vol. 124, No. 1, pp. 349–357, Jul. 1988.
F.J. Boerio, et al., "Spectroscopic Characterization of Polymer Interphases," Adhesion Science Review, pp. 245–260, 1987.
E.P. Plueddemann, "Silane primers for epoxy adhesives," J. Adhesion Sci. Technol., vol. 2, No. 3, pp. 179–188, 1988.
M.A. Jackson, "Guidelines to Formulation of Waterborne Epoxy Primers," Polymer Paint Color Journal, pp. 608–621, 1990.
V. Raghavon and W.H. Lewis, "Epoxy Water–Borner Primer: Low–Temp Cure and Zero VOCs," Modern Paint and Coatings, Jul. 1991.
R. Buehner et al., "Waterborne Epoxy Dispersions Provide Compliant Alternatives," Adhesives Age, vol. 34, No. 13, pp. 24–26, Dec. 1991.
Epoxy resins, Lee & Neville, McGraw–Hill, Chapter 1 to 4.

* cited by examiner

Primary Examiner—Paul Thibodeau
Assistant Examiner—Ramsey Zacharia
(74) Attorney, Agent, or Firm—Fitzpatrick, Cella, Harper & Scinto

(57) ABSTRACT

The subject invention pertains to an aqueous primer for use on metal surfaces to which a composite or a metal adherend is bonded. The primer composition includes an aqueous dispersion of: (a) at least one thermosetting resin curable at an elevated temperature; (b) at least one organosilane, each said organosilane containing at least ore hydrolyzable group; and (c) a curing agent. The aqueous primer composition contains substantially no volatile organic solvent, is environmentally superior to solvent-based primers, is storage stable, exhibits excellent solvent resistance and performs without loss of physical properties.

60 Claims, No Drawings

WATER BASED PRIMER COMPOSITIONS

This invention claims the benefit of U.S. Provisional Application No. 60/058,719, filed Sep. 12, 1997.

BACKGROUND OF THE INVENTION

1. Field of the Invention

The subject invention pertains to an aqueous primer containing a silane adhesion promoter for use on metal surfaces to which composite or metal adherends will be bonded utilizing structural adhesives. More particularly, the subject invention pertains to a primer comprising an aqueous dispersion of a solid thermosetting resin, a silane adhesion promoter and a solid curing agent which contain little or no volatile organic solvent.

2. Description of the Related Art

In the current manufacture of composite structures, particularly in the aerospace and transportation sectors, it is frequently necessary to bond a fabricated metallic structure to metal or composite adherends utilizing structural adhesives, generally structural film adhesives, or to laminate one or more plies of thermosetting resin impregnated fibrous reinforcement to the fabricated metal structure. In general, to ensure the greatest level of adhesive strength, the metal surface(s) are scrupulously cleaned of dirt, soil, grease, and metal oxidation products immediately prior to bonding. Unfortunately, this procedure cannot be generally used most times, as the cleaning and bonding operations are often separated by long periods of time. During such periods, the metal surface may become hydrolyzed, lessening the adhesive strength of the bond. One alternative to overcome this difficulty is to use a primer on the cleaned metal surface. However, many of the commercially available primers do not provide the desired durability or performance required when exposed to harsh environmental conditions.

Primers have often been prepared from one or two component thermosetting resins diluted to sprayable levels with volatile organic solvents. However, the use of primers containing large amounts of volatile organic compounds ("VOCs") is under increasing scrutiny for both toxicological and environmental reasons.

It has been proposed to utilize electro-depositable primers. Such primers contain resin particles bearing a charged group which migrate to an oppositely charged substrate from aqueous solution or dispersion. Such compositions often contain a lower but still undesirable level of VOCs and do not have ideal properties due to the restraints placed on the resin structure. Other ways of applying primers to metal surfaces include spraying, brushing or dipping the metal in a bath of primer.

In addition, liquid epoxy esters were proposed for use in coatings by C. K. Thorstad, "Emulsions—Why and How They are Used", *Modern Plastics*, pp. 83–84, July 1995, in compositions containing either water or the liquid epoxy ester itself as a vehicle, together with polyvinylacetate, polyacrylic, or poly(butadiene/styrene) lattices. Acid curing agents, for example dimethyl acid pyrophosphate or boron trifluoride, are cited for use in these applications.

In U.S. Pat. No. 2,872,427 it has been proposed to utilize aqueous emulsions of liquid epoxy resins in textile treating. Additional suggested uses are in paints and enamels. The emulsions contain one or more emulsified liquid epoxy resins dispersed in an aqueous dispersing phase containing an alkali and acid stable non-ionic emulsifying agent and a water-dispersible binding colloid. For those applications where curing agents are also required, the curing agent is dissolved into the epoxy resin prior to dispersion. Such emulsions are storage stable with respect to sedimentation or coagulation, but suffer from the defect that since the epoxy and curing agent are intimately associated, premature curing may take place, particularly when exposed to elevated temperatures during shipment or storage. Shelf life of such emulsions is extremely limited. Furthermore, the protective colloids utilized are not themselves thermally stable, and may cause high temperature performance of the composition to suffer. Finally, such coatings suffer from lack of solvent resistance.

Raghavon and Lewis in the article "Epoxy Water-Borne Primer: Low-Temp Cure and Zero VOCs", *Modern Paint and Coatings*, July 1991, evidences the need for water-borne primers without VOCs and suggests use of an aqueous dispersion. However, no details of a suitable composition for such use are given.

U.S. Pat. No. 5,001,173 describes basecoats for metal surfaces which are to be latex primed and painted. The basecoat comprises an aqueous epoxy resin dispersion also containing chromium trioxide and preferably phosphoric acid. The use of aromatic amine or other solid epoxy curing agents is not disclosed. The basecoat is followed by a solvent borne primer containing substantial amounts of polyesters. In the article "Guidelines to Formulation of Waterborne Epoxy Primers", M. A. Jackson, *Polymer Paint Color Journal* 180, (4270), 1990 at pages 608–621 discloses two component primer systems containing as one component an epoxy resin dispersion in water and solvent together with various corrosion inhibitors, and, as the second component, a water-reducible amine catalyst in water. Such formulations, however, require mixing or metering of two separate components and are not storage stable.

In the article "Waterborne Epoxy Dispersions Provide Compliant Alternatives", R. Buehner et. al., *Adhesives Age*, December 1991, described waterborne liquid and solid epoxy resin dispersions cured with dicyandiamide and water-soluble 2-methylimidazole catalyst for use as adhesives. However, the shelf life of such dispersions is indicated as only several days or less.

Another significant consideration in the use of primers is the durability and corrosion resistance of the joint formed between the metal surface and the material bonded to the metal surface. This is particularly important in structural applications, such as aircraft structures, because these joints are exposed to a wide range of environmental conditions with extreme temperatures, high humidity, and highly corrosive marine environments. To avoid the failure of the joint as well as to meet stringent commercial passenger and cargo aircraft standards, the adhesive-bonded joint of the structural component must withstand harsh environmental conditions, and, in particular, resistance to corrosion and disbanding in humid, salt-laden environments, especially those resulting from sea spray or deicing materials. Failure of these joints often starts with diffusion of water through the adhesive followed by corrosion of the underlying metal structure. Thus, it is desirable to have a method and composition useful for bonding metal surfaces that delays onset of corrosion and exhibits stability in aqueous and salt-laden environments.

One method to improve the environmental durability of the metal interface in aerospace applications is etching the metal surface in acid and then anodizing it in phosphoric acid or chromic acid. This is particularly necessary for aerospace applications which involves protection of the aluminum oxide surface of aluminum adherends from moisture-induced hydrolysis. It has been found that aluminum substrates etched in acid and then anodized in phosphoric or chromic acid have shown superb environmental durability with either organic or aqueous based primers. However, if the metal surface is merely abraded, or only given the acid etch treatment, only the organic solvent-based primers show superior results. In the case of steel adherends the aqueous-based primers have been found to give unacceptable durability no matter how the surface is treated.

However, chromate and phosphate-based anodizing surface treatments have been found to have a number of disadvantages in that these processes typically use large amounts of water to neutralize the treated metal surfaces, and to rinse off the corrosive acids used for anodization of the metal surface. Disposal of the phosphate or chromate containing waste water is expensive and can be environmentally hazardous. Commercial anodizing processes also require large amounts of electricity to sustain an anodizing current in the anodizing bath, particularly for large metal components, and require expensive equipment such as large anodizing and rinsing tanks, automatic systems for transferring the metal component from the anodizing tank to the rinsing tank, and sizable electrical power supplies. Thus, it is desirable to provide a bonding composition and method that does not use excessive amounts of water or electricity, and that can be used without large capital outlays for expensive equipment.

Another disadvantage of conventional treatment processes is their narrow processing window. Deviation from the processing window can result in poor bonding. For example, in phosphoric acid anodizing processes ("PAA"), if the metal component is not removed from the phosphoric acid bath immediately after the anodization current is turned off, the anodized oxide coating formed on the metal component can be rapidly dissolved by the corrosive chromic or phosphoric acid bath, resulting in a loosely bonded oxide coating. Thus, it is desirable to have a surface treatment process that provides a relatively large processing window to allow flexible production schedules while minimizing failure of the bonded joint.

Another significant disadvantage of conventional surface treatment processes arises from their use of highly toxic and hazardous chemicals, such as hexavalent chromium compounds. Disposal of the waste chromic byproducts, and the large amount of metal sludge dissolved in the acid, has become increasingly expensive in view of stringent environmental regulations and standards. Thus many conventional surface treatment processes are being gradually phased out because of the environmental regulations. Therefore, it is also desirable to have a non-toxic surface treatment process that is substantially environmentally benign.

It is well known in the prior art that silanes can be employed as primers in metal to metal or metal to rubber adhesive bonding. W. Bascom in the review article. "Primers and Coupling Agents", Engineered Materials Handbook, Vol. 3, *Adhesives and Sealants*, page 254, 1990, describes the use of silanes as primers for adhesives; it also describes the addition of silanes to adhesives applied directly to metal or to primed surfaces. Unfortunately, it has been found that silane-based adhesion promoters fail to provide corrosion protection at or under the bond line unless the metal surface (s) is first pre-treated as by anodizing, phosphatizing, and the like. Corrosion prevention at the bond line is very desirable inasmuch as it leads to enhanced environmental resistance.

Silanes have been added to blends of solvents to make primers, and more recently, with the trend towards low or no VOC emissions, silanes have simply been added to water.

U.S. Pat. No. 5,491,481 describes a method to form a corrosion resistant coating on a metal substrate including the steps of providing a homogenous powder mixture of a thermosetting resin and a solid, non-hydrolyzed, functional low molecular weight silane coupling agent, depositing a layer of powder mixture onto the substrate and heating the substrate to a temperature at least equal to the curing temperature for sufficient time to melt the resin and the silane. The resin is cured and forms a cross-linked layer that becomes tightly bonded to the substrate by the silane. This process is limited to the use of homogenous powder mixtures of an epoxy resin and silane and, furthermore, the process is limited to the use of silanes that are solids at ambient temperature. Liquid silanes have been found to polymerize too quickly.

Several years ago, the American Cyanamid Company developed and attempted to commercialize a water based emulsified epoxy primer, which contained an organosilane. W. D. Steinmetz and D. Kohli, "Water-Based Primers for Aerospace Applications", published in "Proceedings of the 34th International SAMPE Symposium", Reno, Nev. (1989). However, this emulsified epoxy primer was inferior to the primer invention disclosed herein for at least the following reasons: the emulsified primer did not work on non-PAA surfaces; it exhibited thickness sensitivity; and it had a short shelf life.

It is also known to provide corrosion protection to steel sheet by coupling with a liquid resin containing a silane coupling agent. These liquid resins have the disadvantage that hydrolyzed silane solutions have a relatively short storage life. Organosilane solutions tend to condense and polymerize thereby minimizing their chemical interaction with paints. Thus, the hydrolyzed silanes have reduced effectiveness as coupling agents.

A comparative study of silanes as primers and additives for epoxy adhesive resins has been conducted by E. D. Plueddeman in the article "Silane Primers for Epoxy Adhesives", *Journal of Adhesion Science Technology*, Vol. 2, No. 3, pp. 179–188, 1988. A variety of silanes were applied to the surfaces of metal and glass substrates as a primer for an epoxy adhesive. After baking the silane an epoxy adhesive was added to the silane primer. The water resistance of epoxy bonds to the glass and metal was measured. Plueddeman found that silanes provided a more durable bond; however, addition of the silane to the epoxy adhesive resin prior to curing instead of using the silane as a primer did not produce consistent results. In some cases the silane performed better as a primer rather than an additive and in others the reverse was true. It appears that the ability of the silane to provide water-resistant bonds between epoxies and metals or glass depended in large part on the particular silane employed.

More recently, corrosion protection to steel sheet was imparted by coating the sheet with a powder containing a silicone resin as described in U.S. Pat. No. 5,077,354. An in-situ polymeric binder mixture comprising an acrylic graft copolymer of a silicone resin in powder paint was employed. Silicone resin and ethylene monomers are dissolved in a solvent heated to 50° C. to 150° C. and mixed until polymerization is completed. The solvent is stripped away leaving a non-gelled polymerization binder. A disadvantage of using this powder paint is believed to be that a good bond is not formed between the paint and steel substrate. Since the silicone resin had already reacted in-situ when combined with the ethylenic monomers forming the acrylic powder, the silicone resin does not act as a coupling agent between the outer acrylic layer and the steel layer.

U.S. Pat. No. 5,139,601 describes an improvement in the bonding of a metal substrate to a similar or dissimilar substrate wherein a primer coating is first applied to at least one metal substrate surface and then the similar or dissimilar substrate is then bonded to the primer-coated metal substrate surface using a bonding adhesive. As at least part of the primer coating, a coating formed of a uniform, ultra-thin film made by immersing, prior to bonding said metal substrate, in a solution of at least one hydrolyzable metal alkoxide of a polymeric network-forming cation, water, a solvent and a base, said solution having undergone substantially no polymer growth, for a time sufficient to form in-situ said film on said substrate is utilized.

WO 97/17144 describes a method and composition useful for treating metal surfaces prior to bonding of the metal surfaces to other materials, including metals, rubber, glass, polymers, sealants, coatings and, in particular, polymeric adhesives to enhance surface adhesion properties and prolong useful life in corrosive environments. The composition comprises: (a) water; (b) metal alkoxide comprising $M(OR)_x$, where M is a metal and R is an alkyl group; (c) organoalkoxysilane comprising silane coupling functional groups capable of bonding with the material to be bonded to the metal surface; and (d) acid to promote hydrolysis and cross-linking of the metal alkoxide and organoalkoxysilane.

It would be an advance in the art to prepare an aqueous adhesive primer which contains little or no VOCs, which increases primary adhesion and is corrosion resistant to environmental conditions when used with commercial adhesives; which is storage stable for extended periods of time when suitably stored (for example, for a period in excess of 24 weeks when stored at temperatures below 5° C., or for a period in excess of three months at ambient temperature); which allows for excellent adhesion of heat-curable resins to the metal substrate, preferably similar to that of a freshly cleaned metal surface; which can be easily and economically prepared; and whose application to the substrate is practical and economical.

SUMMARY OF THE INVENTION

The invention relates to a composition that is useful as a primer for metal surfaces prior to bonding to other materials, promotes corrosion resistance and adhesion of metals, and prolongs useful life in corrosive environments. The primer composition comprises: an aqueous dispersion of: (i) at least one thermosetting resin curable at an elevated temperature; (ii) at least one organosilane, each said organosilane containing at least one hydrolyzable group; and (iii) a curing agent. The primer composition may be prepared by mixing the aforementioned components together. The thermosetting resin is preferably selected from the group consisting of epoxy, bismaleimide, phenolic and unsaturated polyester resins.

In one preferred embodiment the primer composition comprises an aqueous dispersion of: (a) at least one epoxy resin curable at an elevated temperature; (b) at least one organosilane, each said organosilane containing at least one hydrolyzable group; and (c) a curing agent.

The invention also relates to a bondable metal structure comprising at least two metal surfaces bondable to one another at an interface, comprising: (a) a primer coating on each of the metal surfaces, each primer coating comprising an aqueous dispersion of: (i) at least one thermosetting resin curable at an elevated temperature; (ii) at least one organosilane, each said organosilane containing at least one hydrolyzable group; and (iii) a curing agent; and (2) a thermosetting adhesive between the primer coatings such that upon curing the primer coating is capable of bonding with the metal surfaces and the thermosetting adhesive to form a strong and corrosion-resistant joint between the metal surfaces.

The invention further relates to a process for adhering a first metal to a second adherend, comprising: (a) applying to said first metal a primer composition comprising an aqueous dispersion of: (i) at least one thermosetting resin curable at an elevated temperature; (ii) at least one organosilane, each said organosilane containing at least one hydrolyzable group; and (iii) a curing agent; (b) curing said primer composition to prime a surface of said first metal; (c) applying a thermosetting adhesive between the primed surface of said first metal and said second adherend; and (d) applying heat and pressure sufficient to cure said thermosetting adhesive.

The invention also relates to a process for preparing a composite article comprising a metal article and a layer of crosslinkable resin bonded thereto comprising: (a) applying to said metal article a primer composition, comprising an aqueous dispersion of: (i) at least one thermosetting resin curable at an elevated temperature; (ii) at least one organosilane, each said organosilane containing at least one hydrolyzable group; and (iii) a curing agent; (b) curing said primer composition to form a primed metal surface of said metal article; (c) applying a crosslinkable resin to said primed surface of said metal article; and (d) curing said crosslinkable resin.

The invention further relates to a process for priming a metal surface comprising the steps of:

(a) coating the metal surface with a primer composition comprising an aqueous dispersion of: (i) at least one thermosetting resin curable at an elevated temperature; (ii) at least one organosilane, each said organosilane containing at least one hydrolyzable group; and (iii) a curing agent; and (b) heating the primer composition to a temperature sufficiently high to crosslink the primer composition to form an adherend coating on the metal surface.

DESCRIPTION OF THE PREFERRED EMBODIMENTS

The primer composition and process of the present invention is useful for treating metal surfaces prior to bonding of the metal surfaces to other materials, including metals, rubber, glass, polymers, sealants, coatings and, in particular, polymeric adhesives to enhance surface adhesion properties and prolong useful life in corrosive environments. The primer composition of the present invention is particularly useful for promoting corrosion resistance and adhesion of metals, such as aluminum, steel, zinc, nickel, titanium, galvanized or plated metals and alloys. The primer composition is used in adhesively-bonded assemblies of metal to similar or dissimilar substrates whose adhesive bonds exhibit strong resistance to corrosion, heat, water, humidity and chemicals. The primer compositions of the present invention provide enhanced primary adhesion and corrosion protection at or under the bond line without the necessity for first pre-treating the metal surface for the bonding of metal to similar or dissimilar substrates. As employed herein the term "dispersion" means finely divided particles of a material in suspension in another substance. If desired, minor amounts of modified resin can be used in emulsified form in the present invention.

The primer composition of the present invention generally comprises an aqueous dispersion of: (i) at least one thermosetting resin curable at an elevated temperature; (ii) at least one organosilane, each said organosilane containing at least one hydrolyzable group; and (iii) a curing agent.

The primer composition and the process for using the primer are illustrated herein by adhesive bonding of structural aluminum, the word "aluminum" includes high purity aluminum, commercial purity aluminum and aluminum based alloys, such as, for example, the 2000 series (Al—Cu alloys) and the 7000 series (Al—Zn—Mg alloys). The primer composition and method can also be used in other applications, for example to promote: (i) paint adhesion, particularly if corrosion resistance is important as in air frames; (ii) polymer adhesion, for example thermosetting resins to metal surfaces, etc.; and (iii) adhesion of electroplated coatings.

The organosilane compound used in the primer composition has silane functional groups that can react or bond to the material to be bonded to a metal surface. Preferred organsilanes have the following formula:

$$R_1-\underset{\underset{X}{|}}{\overset{\overset{R_2}{|}}{Si}}-\left[\underset{\underset{R_2}{|}}{\overset{\overset{R_2}{|}}{OSi}}\right]_n-R_2$$

wherein n is greater than or equal to 0; wherein each X is OH, OCH$_3$, and OCH$_2$H$_5$; wherein R$_1$ is CH=CH$_2$,

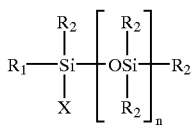

or CH$_2$—CH$_2$—CH$_2$—Y, wherein Y is NH$_2$, SH, OH, NCO, NH—CO—NH$_2$, NH—(CH$_2$)$_3$NH$_2$, NH-Aryl,

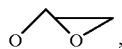

or

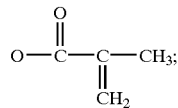

and wherein each R$_2$ is alkyl, alkoxy, aryl, substituted aryl, or R$_1$.

Examples of suitable commercial organosilane compounds available from OSi Specialties Inc., Danbury, Conn. include A-186, a beta-(3,4-epoxycyclo hexyl) ethyltrimethoxy silane; A-187, a gamma-glycidoxypropyltrimethoxysilane; A-189, a gamma-mercaptopropyltrimethoxysilane; A-1100, a gamma-aminopropyltriethoxysilane; A-1106, an aminoalkyl silicone solution; A-1170, a bis-(gamma-trimethoxy-silylpropyl) amine; Y-9669, a N-phenyl-gamma-aminopropyl-trimethoxysilane; Y-11777, an amino alkyl silicone/water solution; and Y-11870, an epoxy functional silane solution. Other suitable commercially available organosilanes include Z-6040, a gamma-glycidoxypropyltrimethoxy silane from Dow Corning, Midland, Mich. and HS2759, an aqueous epoxy functional silane; HS2775, an aqueous amino silane solution; and HS2781 an aqueous oligomeric silane solution with amino and vinyl groups all sold by Huls America Inc., Somerset, N.J. Generally the organosilanes are present in the primer composition in amounts from about 0.01 to 75 parts per hundred parts of the thermosetting resin, preferably from about 0.01 to 30 parts per hundred parts of the thermosetting resin, more preferably from about 0.01 to 10 parts per hundred parts of the thermosetting resin and most preferably from about 1 to 7 parts per hundred parts of the thermosetting resin.

Preferably, the liquid organosilanes are added directly to the aqueous primer composition. The organosilanes are then dispersed in water using conventional methods. For example, one method of dispersing the organosilanes in water comprises dripping the organosilanes into an aqueous solution of thermosetting resin under vigorous stirring. The organosilanes can also be initially dissolved or suspended in a solvent that is miscible with water. In the latter case, the organosilane solution is simply added to the water, without excessive stirring or mixing. The aqueous organosilane solution is then mixed with an aqueous thermosetting composition.

The thermosetting resins that are most useful in the subject invention are epoxy, bismaleimide, phenolic and unsaturated polyester resins. Particularly preferred resins are epoxies and bismaleimides. The epoxy resins of the subject invention are conventional solid epoxy resins having functionalities, of at least about 1.8, preferably at least about 2 functionalities and containing substantially no ionic or ester groups, as described in *Epoxy Resins*, Lee and Neville, McGraw-Hill, Chapters 1 to 4. Preferred epoxy resins are the optionally chain-extended, solid glycidyl ethers of phenols, such as resorcinol and the bisphenols, e.g. bisphenol A, bisphenol F, and the like. Also suitable are the solid glycidyl derivatives of aromatic amines and aminophenols, such as N,N,N',N'-tetraglycidyl-4,4'-diaminodiphenylmethane. Preferred are the solid novolac epoxy resins and solid diglycidyl ether of bisphenol A ("DGEBA") resins. The epoxy resins must be in a solid form, or produce a solid composition when admixed with other epoxies.

Examples of suitable commercial epoxy resins are Epi-Rez® SU-8, a polymeric epoxy resin with an average functionality of about 8, melting point (Durran's) of 82° C., and an epoxy equivalent weight of 215 available from Shell Chemical Co.; DER 669, a high molecular weight solid epoxy resin having a Durran's softening point of 135° C. to 155° C. and an epoxy equivalent weight of 3500–5500 available from the Dow Chemical Company; Epi-Rez® 522-C, a solid DGEBA epoxy having an epoxy equivalent weight of 550–650 and a Durran's melting point of 75° C. to 85° C., available from Shell Chemical Co.; and ECN 1273, 1280, and 1299 novolac solid epoxy resins having epoxy functionalities from 3.8 to 5.4, epoxy equivalent weights of from 225 to 235, and melting points of from 73° C. to 99° C., available from Ciba-Geigy. These resins are generally supplied in solid form and ground to the correct particle size, or supplied as an aqueous dispersion. For example, ECN-1299 is available as an aqueous dispersion from Ciba-Geigy as ECN-1440, and Epi-Rez® 522C is available from Shell Chemical Co. as 35201 epoxy dispersion.

Bismaleimide resins are also well known to those skilled in the art. Preferred bismaleimides are derived from toluenediamine, methylenedianiline, aliphatic diamines, isophorone diamine, and the like. Bismaleimide monomers are well known to those skilled in the art, and are generally prepared by the reaction of maleic anhydride, or substituted maleic anhydride, with a suitable diamine. Both aromatic and aliphatic diamines are suitable for the preparation of the bismaleimide. Suitable diamines for the preparation of bismaleimides also include other aromatic diamines such as phenylenediamine, diaminodiphenylsulfones, diaminodiphenylisopropylidenes, diaminodiphenylketones, diaminodiphenyloxides and diaminodiphenylsulfides. Bismaleimides derived from diamines containing heteroatoms are also useful.

Generally, the bismaleimides are copolymerized with an alkenylphenol or an alkenyloxyphenyl comonomer. Suitable alkenylphenols are o,o'-diallyl- and o,o'-dipropenylbisphenol A, bisphenol F and/or bisphenol S. Also suitable are alkenylphenol and alkenyloxyphenyl terminated dicyclopentadienes.

The bismaleimide resin system of the subject invention may contain one or more comonomers. These comonomers may be comonomers which react with the bismaleimide monomers, or which react with themselves or with other comonomers or may be the same or a different bismaleimide resin in liquid form. Such comonomers include, for example, those described in U.S. Pat. Nos. 4,100,140 and 4,035,345, which are incorporated herein by reference. In addition to such comonomers, the resin systems of the subject invention may also include engineering thermoplastic tougheners, particularly polyimides, polyetherimides, polyetherketones, polyarylenesulfides, polyarylenesulfones, polyethersulfones, and the like. Such thermoplastic tougheners should have glass transition temperatures, $T_g$, in excess of about 100° C.

Suitable epoxy comonomer resins are disclosed in the treatise Handbook of Epoxy Resins, McGraw-Hill, Inc., 1967. Examples of such resins are the bisglycidyl ethers of the bisphenols, particularly bisphenol A, bisphenol F and bisphenol S. Also suitable are the various phenolic and cresolic novolac-type resins, as well as the venous glycidoxy amines and aminophenols, particularly N,N,N', N'-tetrakis (glycidyl)-4,4-diaminodiphenyl methane and N,N,O-tris (glycidyl)-4-aminophenol. Epoxy resins based on the glycidyl ethers of the various dihydroxy-naphthalenes and phenolated dicyclopentadienes are also suitable.

The phenolic resin can comprise novolac type phenolic resin (the so-called random novolac type phenolic resin) wherein the ratio of o-methylene to p-methylene bond is less than 1.0 and/or a resole type phenolic resin (methylol type, or dimethylene ether type). Mixtures of the ordinary novolac type phenolic resin and/or the resole type phenolic resin may also be used.

Thermoplastic phenoxy resins are suitable for use as modifiers and tougheners in the present invention. These are of the waterborne type, preferably those prepared according to the general procedures described in U.S. Pat. Nos. 4,355,122, and 4,638,038, the disclosures of which are incorporated herein by reference.

Water soluble polyether polymers suitable for use as modifiers herein include at least one of a poly(ethylene oxide) or a poly(vinylmethylether) polymer. The poly (ethylene oxide) polymers are well known and commercially available. They are prepared by methods well known in the art and as found in, for example, U.S. Pat. No. 3,417,064.

Emulsions of thermosetting resins, for example emulsified epoxies, may be used as coreactants or modifiers in the present invention. These emulsions may be added to the compositions of the present invention at 1% to 10% levels. Suitable emulsified epoxies are commercially available from Shell Chemical Co., Ciba-Geigy and Vianova. Some examples include ER 3510-W-60 and ER 3515-W-60 from Shell Chemical Co. or PY 323 from Ciba-Geigy.

The aqueous dispersion of the present invention includes a dispersed phase in amounts from 60 to about 10 percent by weight of said aqueous dispersion, and an aqueous continuous phase in amounts from 40 to about 90 percent by weight of said aqueous dispersion. The dispersed phase may preferably comprise a dispersion of more than one thermosetting resin as a mixture of distinct particles, or may consist of only one type of particle containing more than one thermosetting resin. For example, a flexibilizing epoxy such as a higher molecular weight bisphenol A or a bisphenol F epoxy may be blended with a highly temperature resistant epoxy such as tetraglycidyl ether of methylene dianiline ("TGMDA") and the mixture cooled, ground, or otherwise dispersed into solid particles of the requisite size. These same epoxy resins may be advantageously dispersed separately without blending.

As indicated above, a preferred epoxy mixture comprises a solid epoxy resin having an epoxy functionality of no greater than 5.5, and a solid epoxy resin having a functionality of at least 6. The use of higher functionality epoxy resins, i.e. epoxy resins having at least five epoxy functionalities, in minor amounts is preferred. In general less than 40 weight percent of such higher functionality epoxy resins is used based on the sum of the weights of all epoxy resins in the composition. The use of such higher functionality epoxy resins in such minor amounts has been unexpectedly found to increase the solvent resistance of the cured primer without lowering adhesive properties substantially. A preferred high functionality epoxy resin is Epi-Rez® SU-8, a polymeric solid epoxy resin having an average of eight epoxy functionalities.

An especially preferred epoxy composition is a mixture of:
(i) from about 30 to about 70 weight percent of a solid epoxy resin having an epoxy functionality of from about 1.8 to about 4 and an epoxy equivalent weight of from about 400 to about 800;
(ii) from about 5 to about 20 weight percent of a solid epoxy resin having an epoxy functionality of from about 1.8 to about 4 and an epoxy equivalent weight of from about 2000 to about 8000;
(iii) from about 5 to about 40 weight percent of a solid epoxy resin having an epoxy functionality of at least 5 and having an epoxy equivalent weight of from about 100 to about 400; and
said weight percents of said (i) to (iii) totaling 100 percent based on total weight of the epoxy component.

Also especially preferred is a mixture of:
(i) from about 30 to about 70 weight percent of a solid epoxy resin having an epoxy functionality of from about 1.8 to about 4 and an epoxy equivalent weight of from about 400 to about 800;
(ii) from about 5 to about 20 weight percent of a solid epoxy resin having an epoxy functionality of from about 1.8 to about 4 and an epoxy equivalent weight of from about 2000 to about 8000;
(iii) from about 5 to about 40 weight percent of a solid epoxy resin having an epoxy functionality of at least 5 and having an epoxy equivalent weight of from about 100 to about 400; and
said weight percents of said (i) to (iii) totaling 100 percent based on total weight of the epoxy component.

The invention also provides for a bondable metal structure comprising at least two metal surfaces bondable to one another at an interface, comprising:

(1) a primer coating on each of the metal surfaces, each primer coating comprising an aqueous dispersion of: (a) one or more thermosetting resins curable at an elevated temperature; (b) one or more organosilanes, each organosilane containing at least one hydrolyzable group; and (c) a curing agent; and (2) a thermosetting adhesive between the primer coatings such that upon curing the primer coating is capable of bonding with the metal surfaces and the thermosetting adhesive to form a strong and corrosion-resistant joint between the metal surfaces.

A process is provided for adhering a first metal to a second adherend, comprising:

(1) applying to said first metal a primer composition, comprising an aqueous dispersion of: (a) one or more thermosetting resins curable at an elevated temperature; (b) one or more organosilanes, each organosilane containing at least one hydrolyzable group; and (c) a curing agent;

(2) curing said primer composition to prime a surface of said first metal;

(3) applying a thermosetting adhesive between the primed surface of said first metal and said second adherend; and (4) applying heat and pressure sufficient to cure said thermosetting adhesive.

A process for preparing a composite article is also provided comprising a metal article to which is bonded a layer of crosslinkable resin comprising:

(1) applying to said metal article which is to be bonded to said crosslinkable resin a primer composition, comprising an aqueous dispersion of: (a) one or more thermosetting resins curable at an elevated temperature; (b) one or more organosilanes, each organosilane containing at least one hydrolyzable group; and (c) a curing agent;

(2) curing said primer composition to form a primed metal surface of said metal article;

(3) applying a crosslinkable resin to said primed surface of said metal article; and (4) curing said crosslinkable resin.

Preferably the primer is applied to the first metal or the metal article in an amount such that when cured, preferably a primer coating of from about 0.0001 inch to about 0.005 inch thickness is obtained, more preferably a primer coating of from about 0.0001 inch to about 0.0005 inch thickness is obtained and most preferably a primer coating of from about 0.00015 inch to about 0.0003 inch thickness is obtained. The crosslinkable resin is a thermosetting resin which may be applied in any workable form such as a sheet, a liquid or a paste. Typical liquids include paint and the like. The thermosetting resin may further incorporate fibrous reinforcement.

A process for priming a metal surface prior to bonding the metal surface is also provided with the process comprising the steps of:

(1) coating the metal surface with a primer composition comprising an aqueous dispersion of: (a) one or more thermosetting resins curable at an elevated temperature; (b) one or more organosilanes, each organosilane containing at least one hydrolyzable group; and (c) a curing agent; and (2) heating the primer composition to a temperature sufficiently high to crosslink the primer composition to form an adherend coating on the metal surface.

The process for priming a metal surface prior to bonding the metal surface may further comprise the step of roughening the metal surface prior to coating the metal surface with the primer composition. The roughening may be conducted by acid etching or abrading the metal surface.

The curing agents of the subject invention are preferably substantially water insoluble, and solid at room temperature. Examples of such curing agents are aromatic amine curing agents such as 4,4'-diaminodiphenylmethane, 2,2-bis(4-[4-aminophenoxy]phenyl)propane, 3,3'- and 4,4'-diaminodiphenylsulfone, 3,3'- and 4,4'-diaminodiphenyloxide, 3,3- and 4,4'-diaminodiphenyloxide, 3,31'- and 4,4'-diaminodiphenylsulfide, and 3,3'- and 4,4'-diaminodiphenylketone. Other suitable solid diamine curing agents include 2,4-toluenediamine, 1,4-phenylenediamine, 2,2-bis(4-aminophenyl)hexafluoro propane, 2,2-bis(3-amino-4-hydroxyphenyl)hexafluoro propane, 3,4'-diaminodiphenyloxide, 9,9-bis(4-aminophenyl)fluorene, o-toluidine sulfone, and 4,4'-diaminobenzanilide. Particularly preferred are 9,10-bis(4-aminophenyl)anthracene, 2,2-bis(4-[3-aminophenoxy]phenyl)sulfone, 2,2-bis(4-[4-aminophenoxy]phenyl)sulfone, 1,4-bis(4-aminophenoxy)biphenyl, bis(4-[4-aminophenoxy)phenyl) ether, and 2,2-bis ([4-(4-amino-2-trifluorophenoxy)] phenyl) hexafluoropropane. Also preferred is XU 95101 a curing agent commercially available from Ciba-Geigy. Most preferably, those solid amine curing agents having melting points below 240° C., preferably below 175° C. are utilized. Most preferred as a curing agent is 4,4'-[1,4-phenylene(1-methylethylidene)]-bis(benzeneamine).

Also suitable are the amino and hydroxyl terminated polyarylene oligomers wherein the repeating phenyl groups are separated by ether, sulfide, carbonyl, sulfone, carbonate, or like groups. Examples of such curing agents are the amino-and hydroxylterminated polyarylenesulfones, polyaryleneethersulfones, polyetherketones, polyetheretherketones, and like variants. The curing agents are usually present in amounts from about 2 to about 30 parts per hundred of said thermosetting resin.

A primer composition is provided which comprises an aqueous dispersion of (A)(a) a dispersed phase from about 60 to about 10 percent by weight of said aqueous dispersion and (b) an aqueous continuous phase from about 40 to about 90 percent by weight of said aqueous dispersion, and wherein an epoxy resin is present as a mixture of epoxy resins comprising:

(i) from about 30 to about 70 weight percent of a solid epoxy resin having an epoxy functionality of from about 1.8 to about 4 and an epoxy equivalent weight of from about 400 to about 800;

(ii) from about 5 to about 20 weight percent of a solid epoxy resin having an epoxy functionality of from about 1.8 to about 4 and an epoxy equivalent weight of from about 2000 to about 8000;

(iii) from about 5 to about 40 weight percent of a solid epoxy resin having an epoxy functionality of at least 5 and having an epoxy equivalent weight of from about 100 to about 400; and said weight percents of said (i) to (iii) totaling 100 percent based on total weight of the epoxy component;

(B) at least one organosilane, each said organosilane containing at least one hydrolyzable group, said organosilane is selected from the group consisting of beta-(3,4-epoxycyclohexyl) ethyl trimethoxysilane, gamma-glycidoxypropyl trimethoxy silane, gamma-mercapto propyltrimethoxy silane, gamma-aminopropyltriethoxy silane, bis-(gammatrimethoxy silylpropyl)amine, N-phenyl-gamma-aminopropyltrimethoxy silane, and (3-glycidoxypropyl) methyldiethoxysilane; and (C) an aromatic curing agent selected from the group consisting of 2,2-bis(4-[4-aminophenoxy]-phenyl) propane, 4,4'-diaminodiphenylsulfone, 3,3'-diaminodiphenylsulfone, 4,4'-diaminodiphenyl ketone, and 4,4'-[1,4-phenylene(1-methylethylidene)]bis (benzeneamine).

Catalysts are generally unnecessary; however, solid, water-dispersible catalysts may be added when the particular curing agent is not sufficiently active at the primer composition bake temperature to effect cure of the primer composition. The catalyst may be water soluble, water insoluble, or in particulate form having a particle size such that essentially 100 percent of the particles have mean diameters less than about 30 $\mu$m. Typical catalysts that may be employed, include but are not limited to the following, bisureas, blocked imidazoles, substituted imidazoles or other blocked amines such as amine/epoxy adducts, hydrazines, etc.

Preferred catalysts have the following formula:

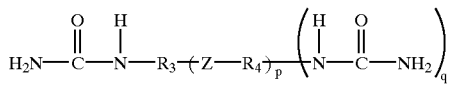

wherein $R_3$ and $R_4$ are independently selected from the group consisting of aryl, substituted aryl, biphenyl, naphthyl and cycloaliphatic and Z may be selected from the group consisting of alkyl, O, S, and $SO_2$; wherein p is 0 or 1; and q is an integer from 1 to 3.

Particularly preferred catalysts are represented by the following formulae:

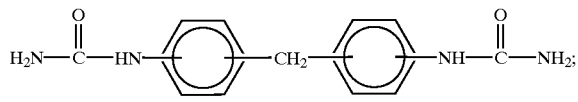

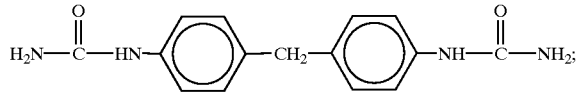

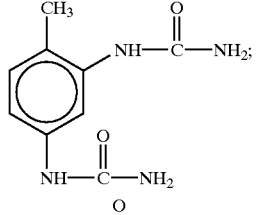

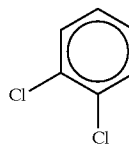 DIURON®; and

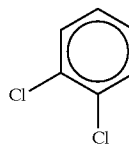 MONOURON®.

MONOURON® and DIURON® are commercially available from Du-Pont Chemical Co.

Volatile organic solvents are generally undesirable and unnecessary. However, if need be minor amounts of such a solvent, i.e. less than 1–5% by weight, can be employed. Examples of volatile organic solvents which could be added without significantly affecting the function and physical properties of the composition include low molecular weight glycols and glycol ethers, N-methylpyrrolidone, and similar solvents. By the term "substantially free of volatile organic solvents" as employed herein is meant that the system contains no volatile organic solvent or such a minor amount that substantially no advantage or difference can be ascertained between the cured physical properties obtained from the completely solventless system and the system containing the minor amount of solvent.

The compositions of the subject invention may include tougheners useful in adhesive systems, for example elastomers, preferably reactive elastomers such as those containing carboxyl, epoxy, amino, or hydroxyl functionalities. If the elastomer is a liquid elastomer, such as a liquid rubber sold under the trade name HYCAR, then the elastomer must first be reacted with an epoxy resin, either a solid or liquid epoxy, to form a prereact chain-extended elastomer which is a solid. The solid prereact may then be ground or milled to particle sizes less than 30 $\mu$m, preferably less than 20 $\mu$m, and most preferably such that the majority of particles are in the 2–5 $\mu$m range or below. If the elastomer is solid, then it may be ground by cryogenic means or the like, if not supplied in the appropriate size range. Whether formed as a prereact or already in solid form, the elastomer is then dispersed with the remaining ingredients.

The amounts of added elastomer are not critical, and amounts from 1 to about 30 weight percent, preferably from about 5 to about 15 weight percent, based on total primer solids are generally adequate.

The composition may optionally contain conventional dyes, pigments, fillers, leveling agents, additional dispersing agents, thickeners, corrosion inhibitors and the like. A benefit of compositions containing dyes or pigments is that surface coverage can be assessed more easily by visual methods. The corrosion inhibitor may be a chromate or a non-chromate inhibitor. Examples of suitable chromate corrosion inhibitors include strontium chromate, barium chromate, zinc chromate, and calcium chromate. Suitable amounts of the chromate corrosion inhibitors range from about 0.125 weight percent to about 30 weight percent. In the case of the presence of fillers in the composition, particularly preferred is fumed colloidal silica.

Non-chromate corrosion inhibitors can also be used in the composition of the present invention. Preferred examples of non-chromate corrosion inhibitors are zinc phosphate, zinc molybdate and SICORIN RZ available from BASF AG, Ludwigshafen, Germany. Suitable amounts of the non-chromate inhibitors range from about 0.125 weight percent to about 15 weight percent.

The dispersions are generally prepared by first dispersing the solid thermosetting resin(s) or blend of solid thermosetting resins into an aqueous vehicle. The thermosetting resins may be heated to above their melting point or dissolved in a solvent to form a concentrated solution, the solvent being later removed by distillation or stripping. Preferably, no solvent is utilized. The resultant liquid thermosetting resin or thermosetting resin solution is dispersed into water to provide solid fine particles by slow addition under high shear agitation; by forcing the thermosetting through metal plates containing numerous micron-sized holes into rapidly agitated water; or by like methods well-known to those of ordinary skill in the art.

Finely ground solid thermosetting resins may be utilized instead of molten, normally solid thermosetting resins. To aid in the maintenance of a stable dispersion, an effective amount of a surfactant may be added. Such a surfactant preferably contains both hydrophilic and hydrophobic (lipophilic) portions. Typically surfactants include simple soaps such as the sodium and ammonium salts of long chain fatty acids, long chain fatty alcohol ethoxylates, alkylphenol ethoxylates or block polyoxyalkylene polyethers containing a hydrophobic moiety derived from repeating polyoxypropylene or polyoxybutylene groups or one or more long chain olefin oxide reaction products and a hydrophilic group comprising repeating oxyethylene groups.

To avoid the necessity of dispersing the thermosetting resins, commercially available dispersions may be utilized to supply certain of the thermosetting resin ingredients. In the case of epoxy dispersions a number are available from commercial sources, for example from Ciba-Geigy, ECN-1400, a dispersion of epoxy novolac ECN 1299 in water; and Epi-Rez® 35201, a dispersion of a solid DGEBA epoxy resin, CMD W50-3519, an elastomer modified epoxy dispersion, and W55-5003, an SU-3 epoxy dispersion, all available from Shell Chemical Co.

The particle size of the thermosetting resin should be such that essentially 100 percent of the particles have sizes less than 30 $\mu$m, preferably less than 20 $\mu$m. Best results are obtained with essentially 100 percent of the particles being less than 16 $\mu$m, with 90 percent less than 2 $\mu$m. Such particles sizes may be obtained by the methods previously described, or by traditional grinding methods such as jet milling, ball milling, or media milling such as zirconium oxide or sand milling. In general, the finer the particle size, the more dispersible the thermosetting resin will be, and also the more resistant to sedimentation. In addition, small particle sizes have been unexpectedly found to increase solvent resistance of the cured primer. The particle sizes herein are measured with a Brinkmann Particle Size Analyzer based on probability number density.

Following dispersion of the thermosetting resin(s) into the aqueous phase, the curing agent is added. The curing agent is first reduced to a fine particle size, preferably from about 0.1 $\mu$m to about 30 $\mu$m, and more preferably from about 1 $\mu$m to about 10 $\mu$m, in diameter, whereby essentially 100 percent of the particles have mean diameters less than 30 $\mu$m.

The curing agent may be also reduced to small particle size by known methods, including spray drying, solution precipitation, ball milling, sand milling, air jet milling, and the like. The fine curing agent particles are added to the thermosetting emulsion or dispersion and agitated until a uniform mixture is obtained. Following or preceding addition of the curing agent, other additives such as dyes, pigments, corrosion preventatives, and the like, may be added.

Either following or before dispersion of the curing agent into the aqueous phase, one or more organosilanes are added. Liquid organosilanes may be added alone or first dissolved in a solvent. Suitable solvents include any solvent miscible with water, and more preferably miscible with one or more of the added thermosetting resins, and such solvents include alcohols, such as methanol, ethanol and isopropanol.

Solid organosilanes may be added in powder form directly to the aqueous dispersion of the thermosetting resins and/or curing agent or alternatively, they may be first placed in a solvent such as the type listed for the liquid organosilanes. The primer composition thus prepared forms a stable liquid solution or dispersion useful for coating a metal surface.

Preferably, the aqueous vehicle is water, more preferably distilled or deionized water. Optionally, the composition can also include conventional solvents useful for dissolving and dispersing organic compounds. Both the water and solvent at least partially hydrolyze the one or more organosilanes of the primer composition. Suitable conventional solvents include any solvent miscible with water, and more preferably miscible, with the one or more thermosetting resins and the one or more organosilanes. Such solvents include alcohols, such as methanol, ethanol and isopropanol.

With regard to the amine curing agent-thermosetting resin ratios, the amine to thermosetting stoichiometry may range from about 0.5 to about 1.5. However, if maximum solvent resistance is desired, the amine/thermosetting ratio should be from about 0.8 to about 1.5, preferably about 1.0. Solvent resistance is assessed by wiping with methylethylketone solvent twenty times after the primer is cured. Acceptable solvent resistance is shown when following 20 wipes there is negligible visible damage to the film, i.e. the film is still intact and of substantially the same thickness as initially. There should be little or no loss of polymer from the cured film.

The low VOC primer is applied by traditional methods, for example by air driven or airless spray guns, by high volume low pressure spray guns, and the like, such as for example, a Binks Model 66 spray gun. Following drying, the finish is baked at a temperature sufficient to cure the coating. Nominal curing temperatures range from about 60° C. to about 200° C., preferably from about 100° C. to about 180° C., and most preferably from about 115° C. to about 125° C. cure time is dependent upon cure temperature and can be, for example from about 0.5 to about 4 hours. Preferably, the primer is cured at about 120° C. for one hour. Nominal cured coating thickness is from about 0.02 to about 1.0 mils (0.5 to 25.4 $\mu$m), preferably from about 0.05 to about 0.5 mils (1.3 to 12.7 $\mu$m), and especially from about 0.05 to about 0.25 mils (1.3 to 6.4 $\mu$m).

Surprisingly, even though the thermosetting resin and curing agent are in generally distinct phases, the coatings produced are of exceptionally high quality. The resultant adherend coating contains functional groups that enhance adhesion of the metal surface by coupling or polymerizing with the material to be bonded to the metal surface, and, in particular, with the polymeric adhesive used to bond metal surfaces to one another. Another advantage of the present composition is that tailored coating microstructures with the desired pore sizes, volume, distribution and lengths can be formed in the adherend coating to provide a tortuous pore structure that provides enhanced bonding capability.

Also, the adherend coating typically resists hydration by diffused moisture and protects the underlying metal surface from corrosion. In addition, the composition is environmentally benign and can be used to coat large areas for mass production, at low cost, and without the use of toxic chemicals, and without use of large amounts of electrical power. In this manner, the composition of the present invention provides an unusually durable and corrosion resistant coating.

An exemplary adhesive-bonded joint formed between two or more metal surfaces using the primer composition of the present invention will now be described. A typical adhesive-bonded joint between metal surfaces comprises (i) adherend coatings of the primer composition of the present invention on the metal surfaces; and (ii) a polymeric adhesive, such as an epoxy, for bonding the primed metal surfaces to one another.

Once the primer has been applied to a first substrate, such as a metal surface, a second adherend, such as a second metal substrate or a composite substrate, can be adhered to the so-primed first substrate in a normal manner by positioning a thermosetting adhesive between the primed surface of the substrate and the second adherend, then applying heat and pressure sufficient to cure thermosetting adhesive. Suitable thermosetting adhesives include FM®73, FM®94, FM®300 and FM®377 adhesive films commercially available from Cytec Engineered Materials, Havre de Grace, Md. FM®73 is a toughened general purpose epoxy adhesive film designed for continuous service at 82° C. FM®94 is an improved version of FM®73. FM®377 is a 177° C. service adhesive with good toughness. Additional thermosetting adhesives suitable for a particularly application, as well as the suitability for such application and curing conditions thereof, are well-known to those of ordinary skill in the art. These include epoxies, polyester, epoxy-polyester, bismaleimide, acrylic, cyanate ester, acrylic-urethane or flurovinyl thermosetting adhesives.

The following examples demonstrate the suitability of the composition and method for coating and bonding a number of metal surfaces, including AM355 steel, 2024-T3 aluminum, bare- and alclad-aluminum and 6AL-4V titanium. The surface preparation for steel substrates involved either an acid etch or grit blasting followed by a final solvent wipe. The aluminum skins were prepared by one of three different methods: (1) grit blasting followed by a solvent wipe; (2) Forest Products Laboratories etch ("FPL"); and FPL followed by phosphoric acid anodization according to the American Standard Testing Method ("ASTM") 3933 protocol. The titanium substrates were prepared by grit blasting and solvent wiping.

The following examples also detail the preparation of primer formulations with and without a silane adhesion promotor. The primers of the present invention were sprayed onto the cleaned surface of a metal panel for testing, the primer coated metal material was allowed to stand at room temperature for 30 minutes, which was then followed by drying at 121° C. for one hour. The target thickness for the primer on the surface of the metal panel was typically from about 0.20 to about 0.30 mils, although other thicknesses were also found to provide satisfactory results.

A polymeric adhesive, such as an epoxy adhesive was applied to the coated metal surfaces for bonding the metal surfaces to one another. After application of the polymeric adhesive to the coated metal surfaces, the metal surfaces are joined to one another, and the joint is firmly held during heat treatment at a temperature and pressure suitable for curing and bonding the metal surfaces to one another. For example, for the FM®73 film adhesive, a suitable heat treatment is at a temperature of from about 120° C. for about 60 minutes, under an applied pressure of about 40 psi. In the case of FM®377 adhesive a cure cycle of 90 minute heat up to 177° C. followed by a 120 minute hold at 177° C., under an applied pressure of about 40 psi was used. While with FM®94 and FM®73 adhesives the cure cycle consisted of a 60 minute heat up to 121° C. followed by a 90 minute hold at 121° C., under an applied pressure of 40 psi.

Metal surfaces joined using the composition and process of the present invention have high shear strengths and good corrosion resistance in harsh environments. The shear strength of a metal joint fabricated using a water based composition of the present invention, as measured by the lap shear joint test described in ASTM D 1002, are typically above those obtained when the metal surface is treated using current commercially available primers. Also, the coatings exhibited good thermodynamic and hydrolytic stability as well as corrosion resistance. Additional mechanical tests were performed on some of metal surfaces joined using the compositions of the present invention included climbing drum peels according to ASTM D 1781 and floating roller peels according to ASTM D 3167.

The environmental stability of the joints formed using the process of the present invention were tested using a wedge crack test according to ASTM 3762-79. Within the tested range, the coatings yielded substantially equivalent, and in many cases less crack growth than that obtained from phosphoric anodizing processes, which indicates good environmental stability.

The following examples demonstrate the suitability of the composition and method for coating and bonding aluminum, steel and titanium substrates.

EXAMPLES 1–3

PRIMER PREPARATION

Primers were prepared having the following compositions by dispersing the following ingredients, in parts by weight.

| COMPONENT | Example 1 (weight percent) | Example 2 (weight percent) | Example 3 (weight percent) |
|---|---|---|---|
| Epi-Rez ® SU-8 epoxy resin[1/] | 10.6 | 10.0 | 10.6 |
| DER 669 epoxy resin[2/] | 13.5 | 0 | 13.5 |
| Bisphenol A/epichlorohydrin copolymer dispersed in water (XU 3903)[3/] | 45.5 | 47.4 | 45.5 |
| Elastomer modified Bis A epoxy dispersed in water (EPI-REZ ® 3519-W-50 Waterborne Resin)[4/] | 0 | 10.3 | 0 |
| 2,2-Bis-4-(4-aminophenoxy) phenyl propane | 10.2 | 12.3 | 10.2 |
| Toluene-2,4-bis- (N,N'-dimethyl urea) | 3.0 | 3.0 | 3.0 |
| Fumed Silica | 1.8 | 1.8 | 1.8 |
| Yellow Dye | 0.3 | 0.3 | 0.3 |
| Strontium Chromate | 15 | 12 | 0 |
| Water | To provide 20 percent solids content | To provide 20 percent solids content | To provide 20 percent solids content |

[1/]Product of Shell Chemical Co., a solid epoxy resin having a functionality of c.a. 8, and an epoxy equivalent weight ("EEW") of 215.
[2/]Product of Dow Chemical Co., a diphenol A based solid epoxy having an EEW of 2300–3800 and a softening point of from 135–155° C.
[3/]Product of Ciba-Geigy, a water dispersion of a solid bisphenol A epoxy resin having a viscosity of 12000 cps at 25° C. and 80 percent solids.
[4/]Product of Shell Chemical Co., a nonionic aqueous dispersion of an elastomer modified bisphenol A based epoxy resin, having a viscosity of 13000 cps at 25° C. and weight per epoxide of 600.

EXAMPLE 4

Primer formulations containing silane were prepared by adding, using a plastic pipet, 1-part Z-6040 (glycidoxypropyl trimethoxysilane available from Dow Corning) per 100 parts of each of the primer formulations prepared in Examples 1–3. These silane containing primer formulations were identified as (4-1) for Example 1, (4-2) for Example 2, and (4-3) for Example 3. Once the addition of the silane was completed, the resulting mixture was shaken to disperse the silane. Before use the primer formulation containing silane was again shaken.

EXAMPLE 5

The primer formulation (4-1) from Example 4 was used to prime 2024 T3 aluminum adherends. The following tables indicate that the primer (4-1) performed its function well, promoting bonding between adherends with the aid of structural adhesives which provide improved hot/wet properties compared to the unmodified primers. The adhesive film used to bond the two aluminum adherends was FM®377 a 177° F. service adhesive with good toughness. The ½" lap shear was measured by the lap shear joint test according to ASTM D 1002 and measures shear strength of the adhesive joint. The higher the lap sheer strength the stronger the bond formed between the two surfaces being bonded together. The climbing drum peels according to ASTM D 1781 and floating roller peels according to ASTM D 3167 were carried out to measure the toughness of the bonded joint and film adhesive. The higher the climbing drum peel value the tougher the film. The wedge crack test according to ASTM 3762-79 was conducted and measures the durability of the bonded joint. The lower the value for the primer with silane also performed better than a control which was applied to a surface that had first been treated with PAA. Thus the primers of the present invention can be used on even poorly prepared surfaces, i.e., grit blast, and still provide the desired strength in the bonded joint.

TABLE 1

FM ® 377 ½" Lap Shears (psi) on Aluminum Surface Preparation Comparison

| Primer | | EXAMPLE 1 CONTROL | (4-1) | (4-1) | (4-1) | EXAMPLE 1 CONTROL |
|---|---|---|---|---|---|---|
| Primer Thickness (mil) | | 0.27/0.27 | 0.29/0.29 | 0.28/0.29 | 0.19/0.22 | 0.32/0.27 |
| Surface Preparation | | grit blast | grit blast | FPL | PAA | PAA |
| Conditioning | Test Temp. | | | | | |
| none | RT | 4380 | 5593 | 4637 | 4166 | 4595 |
| none | 177° C. | 1531 | 1905 | 2195 | 2254 | 2183 |
| 30 days at 60° C. with 100% relative humidity | RT | 2511 | 3294 | 3968 | 3877 | 3908 |
| 30 days at 60° C. with 100% relative humidity | 177° C. | 626 | 1094 | 1347 | 1567 | 1320 |

RT = room temperature.
Test Temp. = test temperature.

TABLE 2

FM ® 377 Climbing Drum Peels (pli) on Aluminum Surface Preparation Comparison

| Primer | | EXAMPLE 1 CONTROL | (4-1) | (4-1) | (4-1) | EXAMPLE 1 CONTROL |
|---|---|---|---|---|---|---|
| Primer Thickness (mil) | | 0.26/0.26 | 0.24/0.24 | 0.23/0.23 | 0.23/0.23 | 0.22/0.22 |
| Surface Preparation | | grit blast | grit blast | FPL | PAA | PAA |
| Conditioning | Test Temp. | | | | | |
| none | RT | 36 | 33.7 | 34 | 41 | 36.7 |
| 30 days with a 5% salt spray | RT | 11 | 34.6 | 38.5 | 38 | 33.8 | crack length after 28 days of testing under hostile conditions the more durable the bond and less crack growth will be observed.

The results shown in Tables 1 and 2 demonstrate that the primer containing silane when used on a poorly prepared grit blasted aluminum surface significantly improves the bond strength and film toughness on the aluminum substrates. When the aluminum was exposed to hostile environmental conditions such as 30 days at 60° C. with 100% relative humidity the lap shear strength for the aluminum surface having a primer containing silane improved by 75% compared to the control sample.

The higher the value for the climbing drum peel test the tougher the adhesive film. The results of the climbing drum peel test in Table 2 showed that the primer with silane applied to a grit blasted aluminum surface tested in a highly corrosive environment (30 days with 5% salt spray) outperformed a control sample by over 200%. Furthermore, the The following table shows the wedge test results for aluminum substrates bonded together with FM®377 in the presence of a primer either with or without silane adhesion promoter present. Each of the resulting aluminum structures were exposed to 60° C. with 100% relative humidity during testing. The crack growth results in Table 3 clearly demonstrate that the aluminum structure with a primer containing silane is more durable compared to a structure fabricated from control material. After four weeks the structure having grit blasted aluminum with primer containing silane (4-1) had a crack length of 1.60 inches while the control structure had a crack length of 2.57 inches, almost a full inch more. Furthermore, the crack length results for the structure with primer (4-1) compared very well to the results obtained for control structure whose surface was first prepared with PAA treatment. The primers of the present invention significantly improve the durability of the bonded structure.

TABLE 3

FM ® 377 Wedge Tests on Aluminum Surface Preparation Comparison

| Primer | (4-1) | (4-1) | EXAMPLE 1 CONTROL | EXAMPLE 1 CONTROL |
|---|---|---|---|---|
| Surface Preparation | FPL | grit blast | PAA | grit blast |
| Primer Thickness (mil) | 0.24/0.24 | 0.24/0.24 | 0.22/0.22 | 0.23/0.23 |
| Crack Length — Initial | 1.42 | 1.38 | 1.33 | 1.37 |
| Crack Length — 1 hour (in) | 1.42 | 1.46 | 1.42 | 1.43 |
| Crack Length — 1 day (in) | 1.57 | 1.52 | 1.53 | 1.93 |
| Crack Length — 7 days (in) | 1.64 | 1.52 | 1.53 | 2.46 |
| Crack Length — 14 days (in) | 1.64 | 1.52 | 1.53 | 2.57 |
| Crack Length — 21 days (in) | 1.64 | 1.52 | 1.53 | 2.57 |
| Crack Length — 28 days (in) | 1.64 | 1.60 | 1.53 | 2.57 |
| Crack Growth (Length after 28 days minus initial length) | 0.22 | 0.22 | 0.20 | 1.20 |

Crack extension studies showed similar results to those obtained for the crack wedge tests shown in Table 3. The following table shows the crack extension tests results following exposure of a number of aluminum structures to 60° C. with 100% relative humidity during testing. The performance of the silane containing primer (4-1) on both grit blasted aluminum and FPL aluminum surfaces provide comparable results to those obtained for aluminum surfaces prepared using PAA treatment.

TABLE 4

FM ®77 Crack Extension Tests on Aluminum Surface Preparation Comparison

| Primer | (4-1) | (4-1) | EXAMPLE 1 CONTROL |
|---|---|---|---|
| Surface Preparation | grit blast | FPL | PAA |
| Crack Energy - Initial (lb/in) | 4.38 | 4.34 | 4.17 |
| Crack Energy - 7 days (lb/in) | 3.73 | 4.12 | 4.04 |
| Crack Energy - 14 days (lb/in) | 3.60 | 3.88 | 4.04 |
| Crack Energy - 28 days (lb/in) | 3.12 | 3.01 | 3.27 |
| Crack Energy - 35 days (lb/in) | 2.15 | 3.01 | 3.27 |

EXAMPLE 6

Primer formulations containing differing amounts of silane were prepared as described in Example 4, wherein the parts of Z-6040 silane (glycidoxypropyl trimethoxysilane available from Dow Corning) per 100 parts of the primer composition of Example 1 are shown in the following table.

TABLE 5

FM ® 377 ½" Lap Shears (psi) on PAA Aluminum
Increased Amounts of Z-6040 Silane Present in the Primer Composition

| Primer | | EXAMPLE 1 CONTROL | 1 part Z-6040 | 5 parts Z-6040 | 10 parts Z-6040 | EXAMPLE 1 Control | 0.2 parts Z-6040 |
|---|---|---|---|---|---|---|---|
| Surface Preparation | | PAA | PAA | PAA | PAA | FPL[1/] | FPL |
| Primer Thickness (mil) | | 0.28/0.28 | 0.22/0.24 | 0.20/0.25 | 0.14/0.18 | 0.3/0.3 | 0.3/0.3 |
| Conditioning | Test Temp. | | | | | | |
| none | RT | 4608 | 3954 | 4048 | 3988 | 3992 | 3981 |
| none | 177° C. | 2197 | 1991 | 2174 | 2017 | 1690 | 1777 |
| 30 days at 60° C. with 100% relative humidity | RT | 3932 | 3552 | 3648 | 3416 | 3235 | 3266 |
| 30 days at 60° C. with 100% relative humidity | 177° C. | 1487 | 1320 | 1255 | 1116 | 808 | 1219 |

[1/]"FPL" Forest Products Laboratories etch.

EXAMPLE 7

The effect of room temperature storage time on primer formulations containing silane was studied and the results are shown in the following table. The data shows that the silane containing primer compositions are room temperature storable and provide comparable performance to primers without silane present.

TABLE 6

FM ® 377 ½" Lap Shears (psi) on PAA Aluminum

| Time Elapsed Since Primer Containing Silane Prepared | | Fresh | 2-Months | 4-Months | CONTROL (No Silane Present) Fresh |
|---|---|---|---|---|---|
| Primer Thickness (mil) | | 0.21/0.26 | 0.32/0.32 | 0.32/0.34 | 0.28/0.29 |
| Conditioning | Test Temp. | | | | |
| none | RT | 4304 | 4083 | 4377 | 4123 |
| none | 177° C. | 2364 | 2239 | 2215 | 2233 |
| 30 days at 60° C. with 100% relative humidity | RT | 3802 | 3633 | 3710 | 3726 |
| 30 days at 60° C. with 100% relative humidity | 177° C. | 1309 | 1316 | 1218 | 1332 |

EXAMPLE 8

Titanium metal substrate was also tested using the primer compositions of the present invention and the results of lap shear test are shown in the following table. The primer composition containing silane on titanium substrates was found to give superior results for hot/wet exposure compared those for titanium substrates having the primer without silane present.

TABLE 7

FM ® 377 ½" Lap Shears (psi) on Grit Blasted Titanium

| Primer | Example 1 CONTROL | (4-1) |
|---|---|---|
| Primer Thickness (mil) | 0.22/0.22 | 0.25/0.25 |
| Test Temp.: RT | 3469 | 3909 |
| Test Temp.: 177° C. | 1066 | 1275 |
| After 24-hr water-boil Test Temp.: RT | 2121 | 2479 |

TABLE 7-continued

FM ® 377 ½" Lap Shears (psi) on Grit Blasted Titanium

| Primer | Example 1 CONTROL | (4-1) |
|---|---|---|
| 30 days at 82° C. with 100% relative humidity Test Temp.: RT | 1889 | 2783 |
| 30 days at 82° C. with 100% relative humidity Test Temp.: 177° C. | 326 | 1162 |

EXAMPLE 9

FM®94 and FM®73 adhesives were tested with the primer compositions containing silane of the present invention on aluminum surfaces and the results are shown in the following tables.

TABLE 8

FM ® 94 M ½" Lap Shears (psi) on Aluminum Surface Preparation Comparison

| Primer | | EXAMPLE 1 CONTROL | (4-1) | (4-1) | (4-1) | EXAMPLE 1 CONTROL |
|---|---|---|---|---|---|---|
| Primer Thickness (mil) | | 0.26/0.26 | 0.38/0.28 | 0.28/0.26 | 0.27/0.28 | 0.26/0.25 |
| Surface Preparation | | grit blast | grit blast | FPL | PAA | PAA |
| Conditioning | Test Temp. | | | | | |
| none | RT | 5064 | 5869 | 6138 | 5947 | 5995 |
| none | 82° C. | 3958 | 4163 | 4416 | 4413 | 4472 |
| 30 days at 60° C. with 100% relative humidity | RT | 2031 | 4019 | 5930 | 5810 | 5499 |

TABLE 8-continued

FM ® 94 M ½" Lap Shears (psi) on Aluminum
Surface Preparation Comparison

| Primer | | EXAMPLE 1 CONTROL | (4-1) | (4-1) | (4-1) | EXAMPLE 1 CONTROL |
|---|---|---|---|---|---|---|
| 30 days at 60° C. with 100% relative humidity | 82° C. | 1946 | 2771 | 3374 | 3378 | 3278 |

TABLE 9

FM ® 94 Floating Roller Peels (pli) on Aluminum
Surface Preparation Comparison

| Primer | | EXAMPLE 1 CONTROL | (4-1) | (4-1) | (4-1) | EXAMPLE 1 CONTROL |
|---|---|---|---|---|---|---|
| Primer Thickness (mil) | | 0.22/0.22 | 0.24/0.36 | 0.19/0.22 | 0.26/0.24 | 0.25/0.24 |
| Surface Preparation | | grit blast | grit blast | FPL | PAA | PAA |
| Conditioning | Test Temp. | | | | | |
| none | RT | 27 | 57.3 | 67.3 | 68.7 | 68.3 |
| 30 days with 5% salt spray | RT | 16.2 | 40 | 66 | 65 | 66 |

TABLE 10

FM ® 73 Wedge Tests on Aluminum
Surface Preparation Comparison

| Primer | (4-1) | (4-1) | EXAMPLE 1 CONTROL | EXAMPLE 1 CONTROL |
|---|---|---|---|---|
| Surface Preparation | FPL | grit blast | PAA | grit blast |
| Primer Thickness (mil) | 0.22/0.22 | 0.22/0.22 | 0.24/0.24 | 0.23/0.23 |
| Crack Length — Initial (in) | 0.965 | 0.995 | 0.935 | 0.895 |
| Crack Length — 1 hour (in) | 0.965 | 1.035 | 1.02 | 2.085 |
| Crack Length — 1 day (in) | 0.965 | 1.085 | 1.02 | 2.34 |
| Crack Length — 7 days (in) | 0.965 | 1.485 | 1.02 | 2.385 |
| Crack Length — 14 days (in) | 0.965 | 1.57 | 1.07 | 2.385 |
| Crack Length — 21 days (in) | 0.965 | 1.61 | 1.07 | 2.435 |
| Crack Length — 28 days (in) | 0.965 | 1.61 | 1.07 | 2.435 |
| Crack Growth (Initial length minus final length) | 0.0 | 0.615 | 0.135 | 1.54 |

TABLE 11

FM ® 94 Crack Extension Tests: Surface Preparation Comparison

| Primer | (4-1) | (4-1) | EXAMPLE 1 CONTROL | EXAMPLE 1 CONTROL |
|---|---|---|---|---|
| Surface Preparation | FPL | grit blast | PAA | grit blast |
| Crack Extension Force (lb./in.) | | | | |
| Initial | 12.38 | 10.54 | 10.18 | 5.22 |
| 7 days | 9.58 | 3.99 | 6.35 | 0.3 |
| 14 days | 7.71 | 3.99 | 6.35 | test stopped |
| 28 days | 4.98 | 2.94 | 3.9 | Not Determined |
| 35 days | 4.52 | 2.61 | 3.5 | Not determined |

TABLE 12

FM ® 94 M ½" Lap Shears on Aluminum
with decreasing amounts of silane adhesion promotor present

| Primer | | EXAMPLE 1 CONTROL | 0.2 parts Z-6040 | 0.02 parts Z-6040 |
|---|---|---|---|---|
| Surface Preparation | | grit blast | grit blast | grit blast |
| Conditioning | Test Temp. | | | |
| none | RT | 4940 psi | 5196 | 5083 |
| none | 82° C. | N/A | 4449 | 4473 |
| 30 days at 60° C. with 100% relative humidity | RT | 1521 | 3852 | 3407 |
| 30 days at 60° C. with 100% relative humidity | 82° C. | 1384 | 2904 | 2580 |

EXAMPLE 10

FM®94 adhesive was tested with the primer compositions containing silane of the present invention on acid etched steel surfaces. In addition, commercially available solvent-based primers BR127 Cytec Materials Inc., Havre de Grace, Md. and EA9210B Hysol, Pittsburgh, Calif. were tested and compared to the primers of the present invention. The solvent based primers were found not to perform as well as the aqueous primer containing silane from Example 4 as shown by the results in the following tables. It was also found that when the steel surface was first treated with Z-6040 followed by spraying with the primer from Example 1 the resulting shear strengths were not as good as those obtained by spraying the surface with aqueous primer (4-1) from Example 4 which contained the silane adhesion promoter Z-6040. Thus, the primers of the present invention have the best resistance to heat and humidity compared to even the traditional solvent-based primers on steel, i.e., BR127. Furthermore, in wedge crack tests (Table 14) it was found that grit blasted aluminum surfaces with primer containing silane (4-1) maintained the shortest crack length over a four week period compared to substrates having solvent-based primers.

TABLE 13

FM ® 94 K ½" Lap Shears on Acid Etched Steel
Primer Comparison

| Primer | | EXAMPLE 1 CONTROL | (4-1) | Z-6040 brushed on the surface followed by spraying with primer from Example 1 | BR127 | EA9210B |
|---|---|---|---|---|---|---|
| Conditioning | Test Temp. | | | | | |
| none | −55° C. | 7400 | 8200 | ND | ND | ND |
| none | RT | 6855 | 6240 | 5636 | ND | ND |
| none | 82° C. | 4200 | 4300 | ND | ND | ND |
| none | 105° C. | 2200 | 2780 | ND | ND | ND |
| 30 days at 60° C. with 100% relative humidity | RT | 1125 | 3820 | 2137 | 3270 | 2197 |
| 30 days at 60° C. with 100% relative humidity | 82° C. | 704 | 1595 | 705 | 1045 | 697 |

ND = not determined.

TABLE 14

FM ® 94 K Wedge Tests on Steel
Primer Comparison

| Primer | EXAMPLE 1 CONTROL | BR127 | EA9210B | (4-1) | (4-1) |
|---|---|---|---|---|---|
| Surface Preparation | acid etch | acid etch | acid etch | acid etch | acid etch |
| Crack Length — Initial (in) | 0.555 | 0.42 | 0.47 | 0.465 | 0.44 |
| Crack Length — 1 hour (in) | 0.915 | 1.405 | 1.02 | 0.75 | 0.81 |
| Crack Length — 24 hours (in) | 1.14 | 1.405 | 1.66 | 1.115 | 1.075 |
| Crack Length — 7 days (in) | 1.325 | 1.405 | 1.66 | 1.115 | 1.075 |
| Crack Length — 14 days (in) | 1.325 | 1.405 | 1.66 | 1.115 | 1.075 |
| Crack Length — 21 days (in) | 1.355 | 1.405 | 1.82 | 1.115 | 1.075 |
| Crack Length — 28 days (in) | 1.425 | 1.405 | 1.82 | 1.31 | 1.11 |
| Crack Growth (Initial length minus final length) | 0.87 | 0.985 | 1.35 | 0.845 | 0.67 |

EXAMPLE 11

The effect of Z-6040 on the solvent-base primer BR127 (Cytec Materials Inc., Havre de Grace, Md.) was studied and the results are shown in the following table. The solvent-based primer BR127 with silane was prepared according to the method described in Example 4. This data shows that the addition of the silane adhesion promoter to the solvent-based primer does not improve its performance unlike the water-based primers containing silane.

TABLE 15

FM ®377 Wedge Tests on PAA Aluminum
BR127 with and without Z-6040 silane

| Primer | BR127 CONTROL | BR127 WITH Z-6040 |
|---|---|---|
| Crack Length - Initial (in) | 1.16 | 1.25 |
| Crack Length - 1 hour (in) | 1.25 | 1.34 |
| Crack Length - 1 day (in) | 1.36 | 1.43 |
| Crack Length - 7 day (in) | 1.36 | 1.43 |
| Crack Length - 14 days (in) | 1.36 | 1.43 |
| Crack Length - 21 days (in) | 1.36 | 1.43 |
| Crack Length - 28 days (in) | 1.36 | 1.43 |
| Crack Growth (Initial length minus final length) | 0.20 | 0.18 |

EXAMPLE 12

The primer formulation (4-2) from Example 4 was used to prime grit blasted aluminum adherends. The following table shows the wedge test results for grit blasted aluminum substrates bonded together with FM®377 in the presence of a primer either with or without silane adhesion promoter present. Each of the resulting aluminum structures was exposed to 60° C. with 100% relative humidity during testing. The durability of the aluminum structure with a primer containing silane is clearly demonstrated by comparison of the final crack growth compared to that of the control structure. After four weeks the structure having grit blasted aluminum with primer containing silane (4-2) had a crack length of 1.66 inches while the control structure had a crack length of 2.77 inches, a difference of over an inch. Furthermore, the crack growth of the control was over 400% more than that of the substrates prepared with the primer (4-2). The primer (4-2) of the present invention significantly improves the durability of the bonded structure.

TABLE 16

FM ®377 Wedge Tests on Aluminum
Surface Preparation Comparison

| Primer | EXAMPLE 2 CONTROL | (4-2) |
|---|---|---|
| Surface Preparation | grit blast | grit blast |
| Crack Length - Initial | 1.485 | 1.43 |
| Crack Length - 1 hour (in) | 1.59 | 1.515 |
| Crack Length - 1 day (in) | 1.59 | 1.58 |
| Crack Length - 7 days (in) | 2.325 | 1.58 |
| Crack Length - 14 days (in) | 2.655 | 1.66 |
| Crack Length - 21 days (in) | 2.73 | 1.66 |
| Crack Length - 28 days (in) | 2.77 | 1.99 |
| Crack Growth (Length after 28 days minus initial length) | 1.285 | 0.23 |

EXAMPLE 13

The primer formulation (4-3) from Example 4 was used to prime grit blasted aluminum adherends. The following table shows the wedge test results for grit blasted aluminum substrates bonded together with FM®377 in the presence of a primer either with or without silane adhesion promoter present. Each of the resulting aluminum structures was exposed to 60° C. with 100% relative humidity during testing. The durability of the aluminum structure with a primer containing silane is again clearly demonstrated by comparison of the final crack growth compared to that of the control structure. After four weeks the structure having grit blasted aluminum with primer containing silane (4-3) had a crack length of 2.29 inches while the control structure had a crack length of 2.85 inches.

TABLE 17

FM ®377 Wedge Tests on Aluminum
Surface Preparation Comparison

| Primer | EXAMPLE 3 CONTROL | (4-3) |
|---|---|---|
| Crack Length - Initial | 1.51 | 1.49 |
| Crack Length - 1 hour (in) | 1.6 | 1.605 |
| Crack Length - 1 day (in) | 2.4 | 1.655 |
| Crack Length - 7 days (in) | 2.655 | 1.705 |
| Crack Length - 14 days (in) | 2.715 | 1.705 |
| Crack Length - 21 days (in) | 2.715 | 1.92 |
| Crack Length - 28 days (in) | 2.85 | 2.29 |
| Crack Growth (Length after 28 days minus initial length) | 1.34 | 0.8 |

EXAMPLE 14

A primer formulation is prepared according to the procedure in Example 4 for primer formulation (4-1) except that a thermosetting phenolic resin GP®5555 from Georgia Pacific is substituted for the DER 669 epoxy resin. The resulting primer formulation is sprayed onto a 2024 T3 aluminum or a AM 355 steel surface. The metal sheets are bonded with an epoxy adhesive film. A wedge test is performed on each of the resulting structures and satisfactory results are obtained.

EXAMPLE 15

A primer formulation is prepared from a water dispersed phenolic thermosetting resin GP®5546 from Georgia Pacific by mixing one part of a silane coupling agent per one hundred parts of the phenolic resin. The resulting primer is applied and tested as in Example 5 and satisfactory results are obtained.

EXAMPLE 16

A primer formulation is prepared according to the procedure in Example 4 for primer formulation (4-1) except that 50% of the XU 3903 epoxy resin is substituted with a Matrimid 5292 bismaleimide thermosetting resin available from Ciba-Geigy. The resulting primer is applied and tested as in Example 5 and satisfactory results are obtained.

EXAMPLE 17

A mixture of 500 g of Matrimide 5292A from Ciba-Geigy, 500 g of TM 123 resin from Shell Chemical Co. and 5 g Triton B are grounded in a media mill until a particle size of less than 1 micron is obtained. With vigorous stirring, 5 g of A1100 silane from OSi Specialties, Inc., Danbury, Conn. is added. This mixture is sprayed onto aluminum sheets, which are cleaned in accordance with ASTM D2651-79G, using a DeVilbus spray gun to a thickness of 0.0003 mil. The primer is air dried and allowed to cure at 180° C. for 60 minutes. The metal sheets are bonded with FM®450 adhesive from Cytec Industries according to the manufacturer's instructions to give a bonded panel. Satisfactory results are obtained when testing is performed on the bonded metal sheets.

EXAMPLE 18

A primer formulation is prepared according to the procedure in Example 4 for primer formulation (4-1) except that PAPHEN® phenoxy waterborne dispersion PKHW® 35 resin is substituted for the DER 669 epoxy resin. The resulting primer formulation is sprayed onto a 2024 T3 aluminum or a AM 355 steel surface. The metal sheets are bonded with an epoxy adhesive film. Wedge and lap sheer tests are performed on each of the resulting structures and satisfactory results are obtained.

The compositions and processes of the present invention have numerous advantages. The compositions allow the use of an environmentally benign surface treatment process for metal surfaces and enhances bond strength, delays onset of corrosion and exhibits stability in aqueous and salt laden environmental conditions. The surface treatment process also provides a relatively large processing window and minimizes failure of adhesive bonded joints. Further, excessive amounts of electricity are not required. Also, the surface treatment process can be applied by spraying or brushing and does not require a large capital outlay.

Other variations and modifications which will be obvious to those skilled in the art can be made in the foregoing examples without departing from the spirit or scope of the invention.

What is claimed is:

1. A primer composition for a metal surface comprising: an aqueous dispersion of
   (i) at least one thermosetting resin;
   (ii) at least one organosilane, each said organosilane containing at least one hydrolyzable group; and
   (iii) a curing agent solid at room temperature and active at a cure temperature between 60° C. and 200° C.,
   said primer composition curing at the cure temperature to enhance the adhesion between said metal surface and a polymeric adhesive.

2. The primer composition of claim 1, wherein said thermosetting resin is selected from the group consisting of epoxy, bismaleimide, phenolic and unsaturated polyester resins.

3. The primer composition of claim 2, wherein said thermosetting resin is selected from the group consisting of epoxy, bismaleimide and phenolic resin.

4. A primer composition for a metal surface comprising: an aqueous dispersion of
   (i) at least one epoxy resin;
   (ii) at least one organosilane, each said organosilane containing at least one hydrolyzable group; and
   (iii) a curing agent, solid at room temperature and active at a cure temperature between 60° C. and 200° C.,
   said primer composition curing at the cure temperature to enhance the adhesion of said metal surface to a polymeric adhesive.

5. The primer composition of claim 4, wherein said organosilane is present in an amount from about 0.01 to about 75 parts per hundred parts of said epoxy resin.

6. The primer composition of claim 5, wherein said organosilane is present in an amount from about 0.01 to about 30 parts per hundred parts of said epoxy resin.

7. The primer composition of claim 6, wherein said organosilane is present in an amount from about 0.01 to about 10 parts per hundred parts of said epoxy resin.

8. The primer composition of claim 7, wherein said organosilane is present in an amount from about 1 to about 7 parts per hundred parts of said epoxy resin.

9. The primer composition of claim 4, wherein said curing agent is present in an amount from about 2 to about 30 parts per hundred parts of said epoxy resin.

10. The primer composition of claim 4, wherein said organosilane is selected from the group consisting of beta-(3,4-epoxycyclohexyl)ethyl trimethoxysilane, gamma-glycidoxypropyl trimethoxysilane, gamma-mercaptopropyltrimethoxy silane, gamma-aminopropyltriethoxysilane, bis-(gamma-trimethoxysilylpropyl)amine, N-phenylgamma-aminopropyltrimethoxysilane, and (3-glycidoxypropyl) methyldiethoxysilane.

11. The primer composition of claim 4, further comprising an effective amount of a catalyst to effect curing of the primer composition.

12. The primer composition of claim 11, wherein said catalyst has one of the following structures:

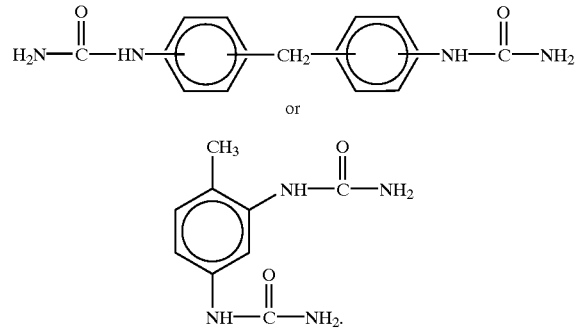

13. The primer composition of claim 4, having less than 1 percent by weight volatile organic solvents.

14. The primer composition of claim 4, further comprising a chromate or a non-chromate corrosion inhibitor.

15. The primer composition of claim 14, wherein said chromate corrosion inhibitor is selected from the group consisting of strontium chromate, barium chromate, zinc chromate, and calcium chromate.

16. The primer composition of claim 4, further comprising a pigment or a filler.

17. The primer composition of claim 16, wherein said filler is fumed colloidal silica.

18. The primer composition of claim 4, wherein said curing agent is an amine curing agent.

19. The primer composition of claim 18, wherein said amine curing agent is selected from the group consisting of 2,2-bis(4-[4-aminophenoxy]phenyl)propane, 4,4'-diaminodiphenylsulfone, 3,3'-diaminodiphenylsulfone, 4,4'-diaminodiphenylketone, and 4,4'-[1,4-phenylene(1-methylethylidene)]bis(benzeneamine).

20. The primer composition of claim 4, wherein said epoxy resin is present as a mixture of epoxy resins comprising:
    (i) a solid epoxy resin having an epoxy functionality of no greater than 5.5, and
    (ii) a solid epoxy resin having an epoxy functionality of at least 6.

21. The primer composition of claim 4, wherein said aqueous dispersion comprises (a) a dispersed phase from about 60 to about 10 percent by weight of said aqueous dispersion and (b) an aqueous continuous phase from about 40 to about 90 percent by weight of said aqueous dispersion, and wherein said epoxy resin is present as a mixture of epoxy resins comprising:

(i) from about 40 to about 70 weight percent of a solid epoxy resin having an epoxy functionality of from 1.8 to 4 and an epoxy equivalent weight of from about 400 to about 800;

(ii) from about 5 to about 20 weight percent of a solid epoxy resin having an epoxy functionality of from 1.8 to 4 and an epoxy equivalent weight of from about 2000 to about 8000;

(iii) from about 5 to about 40 weight percent of a solid epoxy resin having an epoxy functionality of at least 5 and having an epoxy equivalent weight of from about 100 to about 400; and said weight percents of said (i) to (iii) totaling 100 percent based on total weight of the epoxy component.

22. The primer composition of claim 4, wherein said aqueous dispersion comprises (a) a dispersed phase from about 60 to about 10 percent by weight of said aqueous dispersion and (b) an aqueous continuous phase from about 40 to about 90 percent by weight of said aqueous dispersion, and wherein said epoxy resin is present as a mixture of epoxy resins comprising:

(i) from about 40 to about 70 weight percent of a solid epoxy resin having an epoxy functionality of from 1.8 to 4 and an epoxy equivalent weight of from about 400 to about 800;

(ii) from about 5 to about 20 weight percent of a elastomer modified solid epoxy resin having an epoxy functionality of from 1.8 to 4 and an epoxy equivalent weight of from about 400 to about 800;

(iii) from about 5 to about 40 weight percent of a solid epoxy resin having an epoxy functionality of at least 5 and having an epoxy equivalent weight of from about 100 to about 400; and said weight percents of said (i) to (iii) totaling 100 percent based on total weight of the epoxy component.

23. The primer composition of claim 4, having no volatile organic solvents.

24. A cured primer composition for a metal surface prepared by mixing:

(i) at least one epoxy resin;

(ii) at least one organosilane, each said organosilane containing at least one hydrolyzable group; and (iii) a curing agent solid at room temperature and active at a cure temperature between 60° C. and 200° C.; and curing at a temperature between 60° C. and 200° C., said cured primer composition having functional groups enhancing adhesion of said metal surface to a polymeric adhesive.

25. The primer composition of claim 24, wherein said organosilane is present in an amount from about 0.01 to about 75 parts per hundred parts of said epoxy resin.

26. The primer composition of claim 25, wherein said organosilane is present in an amount from about 0.01 to about 30 parts per hundred parts of said epoxy resin.

27. The primer composition of claim 26, wherein said organosilane is present in an amount from about 0.01 to about 10 parts per hundred parts of said epoxy resin.

28. The primer composition of claim 27, wherein said organosilane is present in an amount from about 1 to about 7 parts per hundred parts of said epoxy resin.

29. The primer composition of claim 24, wherein said curing agent is present in an amount from about 2 to about 30 parts per hundred parts of said epoxy resin.

30. The primer composition of claim 24, wherein said organosilane is selected from the group consisting of beta-(3,4-epoxycyclohexyl)ethyl trimethoxysilane, gamma-glycidoxypropyl trimethoxysilane, gamma-mercaptopropyltrimethoxy silane, gamma-aminopropyltriethoxysilane, bis-(gammatrimethoxysilylpropyl)amine, N-phenyl-gamma-aminopropyltrimethoxysilane, and (3-glycidoxypropyl)methyldiethoxysilane.

31. The primer composition of claim 24, further comprising an effective amount of a catalyst to effect curing of the primer composition.

32. The primer composition of claim 31, wherein said catalyst has one of the following structures:

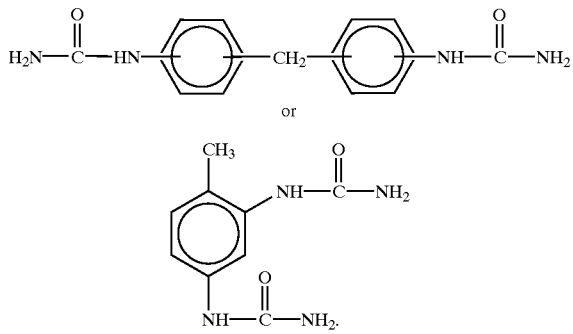

33. The primer composition of claim 24, having less than 1 weight percent of volatile organic solvents.

34. The primer composition of claim 24, further comprising a chromate or a non-chromate corrosion inhibitor.

35. The primer composition of claim 34, wherein said chromate corrosion inhibitor is selected from the group consisting of strontium chromate, barium chromate, zinc chromate, and calcium chromate.

36. The primer composition of claim 24, further comprising a pigment or a filler.

37. The primer composition of claim 36, wherein said filler is fumed colloidal silica.

38. The primer composition of claim 24, wherein said curing agent is an aromatic amine curing agent.

39. The primer composition of claim 38, wherein said aromatic amine curing agent is selected from the group consisting of 2,2-bis(4-[4-aminophenoxy]phenyl)propane, 4,4'-diaminodiphenylsulfone, 3,3'-diaminodiphenylsulfone, 4,4'-diaminodiphenylketone, and 4,4'-[1,4-phenylene(1-methylethylidene)]bis(benzeneamine).

40. The primer composition of claim 24, wherein said epoxy resin is present as a mixture of epoxy resins comprising:

(i) a solid epoxy resin having an epoxy functionality of no greater than 5.5, and (ii) a solid epoxy resin having an epoxy functionality of at least 6.

41. The primer composition of claim 24, wherein said aqueous dispersion comprises (a) a dispersed phase from about 60 to about 10 percent by weight of said aqueous dispersion and (b) an aqueous continuous phase from about 40 to about 90 percent by weight of said aqueous dispersion, and wherein said epoxy resin is present as a mixture of epoxy resins comprising:

(i) from about 40 to about 70 weight percent of a solid epoxy resin having an epoxy functionality of from 1.8 to 4 and an epoxy equivalent weight of from about 400 to about 800;

(ii) from about 5 to about 20 weight percent of a solid epoxy resin having an epoxy functionality of from 1.8 to 4 and an epoxy equivalent weight of from about 2000 to about 8000;

(iii) from about 5 to about 40 weight percent of a solid epoxy resin having an epoxy functionality of at least 5 and having an epoxy equivalent weight of from about 100 to about 400; and said weight percents of said (i) to (iii) totaling 100 percent based on total weight of the epoxy component.

42. The primer composition of claim 24, wherein said aqueous dispersion comprises (a) a dispersed phase from about 60 to about 10 percent by weight of said aqueous dispersion and (b) an aqueous continuous phase from about 40 to about 90 percent by weight of said aqueous dispersion, and wherein said epoxy resin is present as a mixture of epoxy resins comprising:

(i) from about 40 to about 70 weight percent of a solid epoxy resin having an epoxy functionality of from 1.8 to 4 and an epoxy equivalent weight of from about 400 to about 800;

(ii) from about 5 to about 20 weight percent of a elastomer modified solid epoxy resin having an epoxy functionality of from 1.8 to 4 and an epoxy equivalent weight of from about 400 to about 800;

(iii) from about 5 to about 40 weight percent of a solid epoxy resin having an epoxy functionality of at least 5 and having an epoxy equivalent weight of from about 100 to about 400; and said weight percents of said (i) to (iii) totaling 100 percent based on total weight of the epoxy component.

43. The primer composition of claim 24, containing no volatile organic solvents.

44. A bondable metal structure comprising at least two metal surfaces bondable to one another at an interface, comprising:

(a) a primer coating on each of the metal surfaces, each primer coating comprising an aqueous dispersion of: (i) at least one thermosetting resin; (ii) at least one organosilane, each said organosilane containing at least one hydrolyzable group; and (iii) a curing agent solid at room temperature and active at a cure temperature between 60° C. and 200° C., each said primer coating cured at a temperature between 60° C. and 200° C.; and (b) a thermosetting adhesive between the primer coatings such that upon curing of the thermosetting adhesive the primer coating is capable of bonding with the metal surfaces and the thermosetting adhesive to form a strong and corrosion-resistant joint between the metal surfaces.

45. The bondable metal structure of claim 44, wherein the thermosetting adhesive is selected from the group consisting of epoxies, polyester, epoxypolyester, bismaleimide, acrylic, cyanate ester, and acrylic-urethane adhesives.

46. A primer composition comprising an aqueous dispersion of (A)(a) a dispersed phase from about 60 to about 10 percent by weight of said aqueous dispersion and (b) an aqueous continuous phase from about 40 to about 90 percent by weight of said aqueous dispersion, paid dispersed phase comprising a mixture of epoxy resins comprising:

(i) from about 40 to about 70 weight percent of a solid epoxy resin having an epoxy functionality of from 1.8 to 4 and an epoxy equivalent weight of from about 400 to about 800;

(ii) from about 5 to about 20 weight percent of a solid epoxy resin having an epoxy functionality of from 1.8 to 4 and an epoxy equivalent weight of from about 2000 to about 8000;

(iii) from about 5 to about 40 weight percent of a solid epoxy resin having an epoxy functionality of at least 5 and having an epoxy equivalent weight of from about 100 to about 400; and said weight percents of said (i) to (iii) totaling 100 percent based on total weight of the epoxy component;

(B) at least one organosilane, each said organosilane containing at least one hydrolyzable group, said organosilane is selected from the group consisting of beta-(3,4-epoxycyclohexyl) ethyl trimethoxysilane, gamma-glycidoxypropyl trimethoxysilane, gamma-mercaptopropyltrimethoxy silane, gamma-aminopropyltriethoxysilane, bis-(gammatrimethoxysilylpropyl)amine, N-phenyl-gammaamino-propyltrimethoxysilane, and (3-glycidoxypropyl)methyl-diethoxysilane; and (C) an aromatic curing agent selected from the group consisting of 2,2-bis(4-[4-aminophenoxy]-phenyl) propane, 4,4'-diaminodiphenylsulfone, 3,3'-diaminodiphenylsulfone, 4,4'-diaminodiphenyl ketone, and 4,4'-[1,4-phenylene(1-methylethylidene)]bis (benzeneamine).

47. The primer composition of claim 46, wherein said organosilane is present in an amount from about 0.01 to about 75 parts per hundred parts of said epoxy resin.

48. The primer composition of claim 47, wherein said organosilane is present in an amount from about 0.01 to about 30 parts per hundred parts of said epoxy resin.

49. The primer composition of claim 48, wherein said organosilane is present in an amount from about 0.01 to about 10 parts per hundred parts of said epoxy resin.

50. The primer composition of claim 49, wherein said organosilane is present in an amount from about 1 to about 7 parts per hundred parts of said epoxy resin.

51. The primer composition of claim 46, wherein said curing agent is present in an amount from about 2 to about 30 parts per hundred parts of said epoxy resin.

52. The primer composition of claim 46, further comprising an effective amount of a catalyst to effect curing of the primer composition.

53. The primer composition of claim 52, wherein said catalyst has one of the following structures:

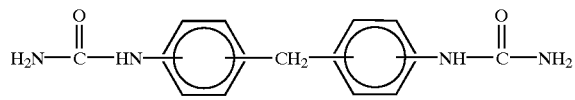

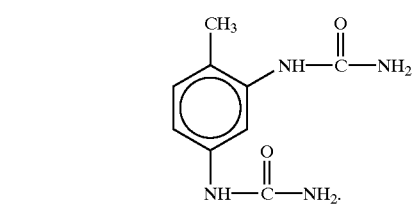

54. The primer composition of claim 46 having less than 1 percent by weight volatile organic solvents.

55. The primer composition of claim 46 further comprising a corrosion inhibitor.

56. The primer composition of claim 55, wherein said corrosion inhibitor is a chromate corrosion inhibitor.

57. The primer composition of claim 56, wherein said chromate corrosion inhibitor is selected from the group consisting of strontium chromate, barium chromate, zinc chromate, and calcium chromate.

58. The primer composition of claim 46, further comprising a pigment or a filler.

59. The primer composition of claim 58, wherein said filler is fumed colloidal silica.

60. The primer composition of claim 46, containing no volatile organic solvents.

* * * * *